Figure 1:
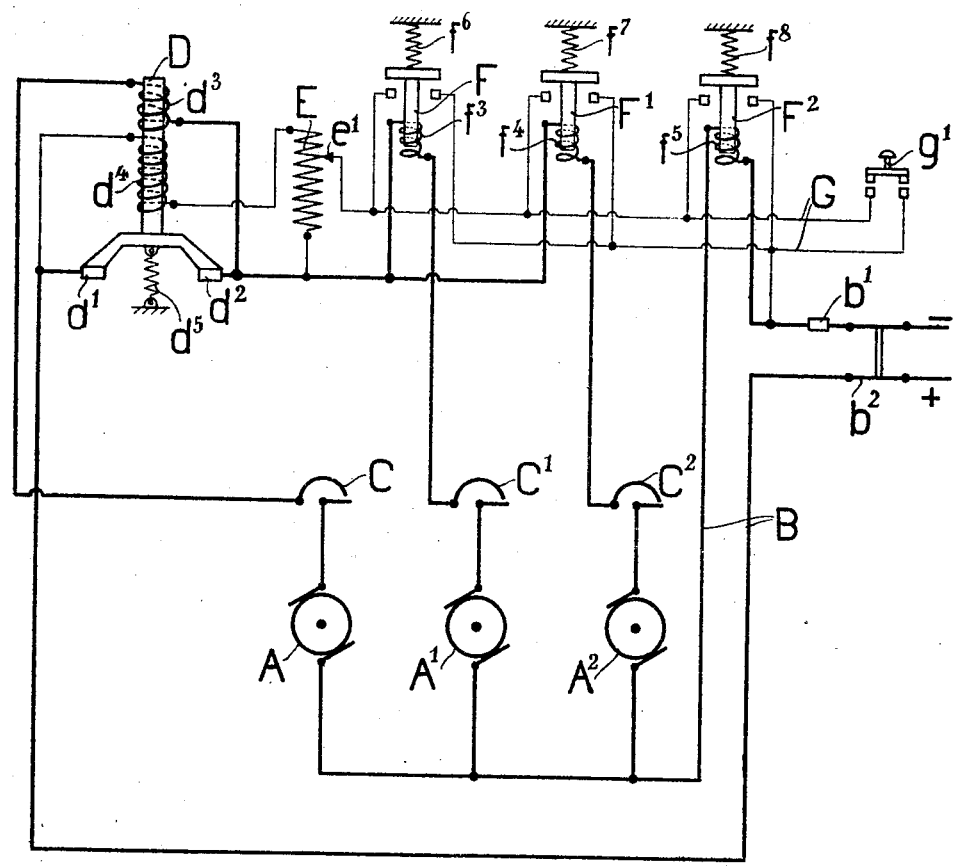

May 24, 1927. 1,630,214
J. PFRETZSCHNER
ELECTRIC OVERLOAD PROTECTIVE SYSTEM
Filed March 27, 1922   2 Sheets-Sheet 2

Patented May 24, 1927.

1,630,214

UNITED STATES PATENT OFFICE.

JAKOB PFRETZSCHNER, OF ESSEN, GERMANY, ASSIGNOR TO FRIED. KRUPP AKTIEN-GESELLSCHAFT, OF ESSEN-ON-THE-RUHR, GERMANY.

ELECTRIC OVERLOAD PROTECTIVE SYSTEM.

Application filed March 27, 1922, Serial No. 547,243, and in Germany May 26, 1921.

This invention relates to improvements in overload protective systems for electric plants which contain a plurality of motors connected in parallel, and it has for its object to provide a system of this kind in which an overload circuit-breaker is placed in the main current circuit and in which the several motor branch circuits contain each a contacter which, when operated, will produce an exciting current in a coil of the overload circuit-breaker of such a strength as to cause the overload circuit-breaker to be opened.

Figure 2:
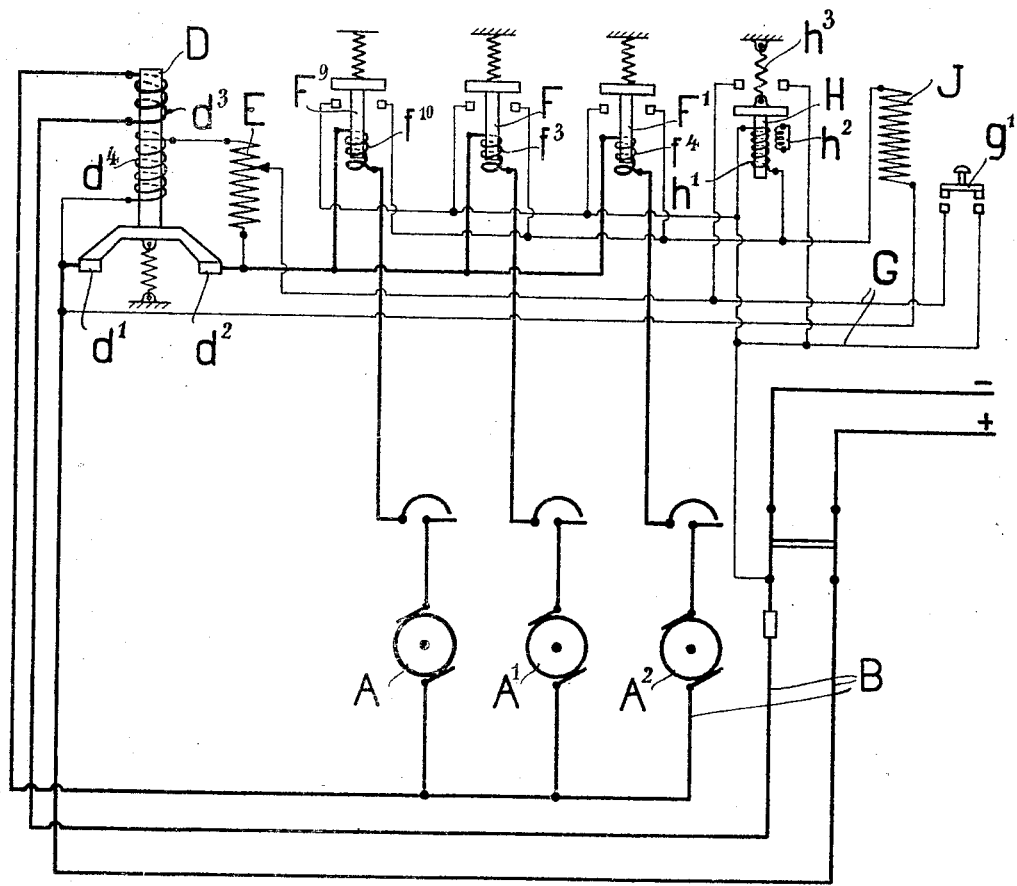

In the drawings:

Figs. 1 and 2 show, by way of example, diagrams of two different forms of electric overload protective systems for cranes which are provided with a hoisting motor, a motor for driving the crane and a motor for driving the travelling crab.

Referring now to Fig. 1 of the drawings, in which similar characters of reference indicate corresponding parts, A, $A^1$ and $A^2$ designate the armatures of the three motors which are connected in parallel and which are, besides, connected to a source of direct current by means of a common line B. The line B contains a fuse $b^1$ and a manually actuated double-pole cut-out $b^2$. A starter C, $C^1$ and $C^2$, respectively, is placed in each of the current circuits of the motor armatures. The line B includes two contact points $d^1$ and $d^2$ which form the break of an overload circuit-breaker, the magnet core D of which is encircled by two exciting coils $d^3$ and $d^4$. The coil $d^3$ is connected in series with the motor armature A and, in case of overload, causes the release of the circuit-breaker. The coil $d^4$ is put in shunt to the break $d^1$ $d^2$ and is connected in series with a resistance E. The magnet core D is also under the action of a spring $d^5$ which tends to keep the circuit-breaker in closed position contrary to the magnetic force of the coils $d^3$ and $d^4$. The magnetic forces of the overload circuit-breaker are so proportioned that, if an overload is produced in the current circuit of the motor armature A and consequently in the main releasing coil $d^3$, the circuit-breaker will move into open position and will remain in this position as long as current flows through the shunt coil $d^4$. The magnetic pulling force of the coil $d^4$ is, however, not strong enough to open the closed overload circuit-breaker as long as the entire resistance E is switched in. The coil $d^4$ will hereinafter be called "holding coil" because of its property to hold the circuit-breaker in its cut-out position when once opened.

Three magnet windings $f^3$, $f^4$ and $f^5$ are placed in the line B as well as in the lines containing the motor armatures $A^1$ and $A^2$. These windings encircle the magnet cores F, $F^1$ and $F^2$ of contactors, the break-points of which are connected in parallel with the break of a conductor G which break is liable to be bridged by a push-button switch $g^1$. One end of the conductor G is branched from a point $e^1$ of the resistance E, while its other end is connected with the line B at a point intermediate the fuse $b^1$ and the magnet winding $f^5$. The portion of the series resistance E lying between the point $e^1$ and the holding coil $d^4$ is of such a length that, upon bridging the break of the conductor G or any one of the breaks of the contactors F, $F^1$ or $F^2$, a current will flow through the holding coil $d^4$ which will suffice to move the overload circuit-breaker D to $d^4$ into its open position. The magnet cores F, $F^1$ and $F^2$ of the contactors are engaged by springs $f^6$, $f^7$ and $f^8$, respectively, which tend to draw the magnet cores into the open position of the contactors. The magnet windings $f^3$, $f^4$, $f^5$ and the spring $f^6$, $f^7$, $f^8$ are proportioned so that each of the magnet windings is adapted to bring about the closing of the contactor controlled by it, contrary to the action of the corresponding spring as soon as the current in the circuit including the said windings exceeds its admissible maximum strength. With relation to the magnet windings $f^3$ and $f^4$, this maximum current strength is defined in accordance with the working conditions of the motor armatures $A^1$ and $A^2$, while the degree of the current strength at which the main current releasing coil $d^3$ of the overload circuit-breaker enters into action, is defined in conformity with the working conditions of the motor armature A. As regards the magnet winding $f^5$, the respective maximum current strength is equal to the sum of maximum loads admissible for the several motor armatures A, $A^1$, $A^2$.

If all parts are in the position shown in Fig. 1, all of the three motors are inoperative and ready for working, since the manually actuated cut-out $b^2$ and the overload circuit breaker D are closed, while the starters C, $C^1$, $C^2$, the contactors F, $F^1$, $F^2$ and the push-button switch $g^1$ are in open position. If now the motors A, $A^1$ and $A^2$ are being started successively or simultaneously by switching in the starters C, $C^1$ and $C^2$, the overload circuit-breaker D remains closed as long as an overload is not produced in one of the armature circuits or in the line B or unless the push-button switch $g^1$, which is provided for cases of accident, is closed. If, for example, an overload is produced in the section containing the main releasing coil $d^3$ and the motor armature A, the increased magnetic pulling force of the coil $d^3$ will institute an immediate release of the overload circuit-breaker D. If, however, the overload is produced in any of the sections of the circuits which contain the windings $f^3$, $f^4$ or $f^5$, the bridging of the break of one of the contactors F, $F^1$, $F^2$ will short-circuit the larger portion of the resistance E and energize the holding coil $d^4$ so violently that its pulling force will now suffice to overcome the antagonistic spring action and open the overload circuit-breaker D. The closing of the push-button switch $g^1$ will have the same effect on the holding coil $d^4$ and will thereby cause the release of the overload circuit-breaker D.

If the cause which produced the overload has been removed and it is intended to bring the overload circuit-breaker D again into closed position, the holding coil $d^4$ will have to be deenergized. It will not be sufficient for this purpose to move only the starter of that armature circuit in which the overload was produced, into the open position shown, but all of the starters will have to be cut out as there would otherwise still be some closed circuit energizing the holding coil $d^4$. The fact that all of the starters must be moved to open position before the working of the motors can be re-commenced, aids considerably in protecting the motors, which have been stopped by the opening of the overload circuit-breaker D, against inadmissible current-shocks.

The plant is protected from the injurious effect of an earth connection by the contactor $F^2$ and the fuse $b^1$ which are both placed in the line B.

According to the modification illustrated by Fig. 2, the main releasing coil $d^3$ of the overload circuit-breaker D is arranged in the line B which, in this case, conducts the entire current for all three motors A, $A^1$ and $A^2$. As for the rest, the construction and arrangement of the overload circuit-breaker D is the same as that described with relation to Fig. 1. However, the current circuit of the motor armature A contains the magnet winding $f^{10}$ of a contactor $F^9$ which corresponds in all its parts to the contactors F and $F^1$ comprising each a magnet winding $f^3$ and $f^4$ and being placed in the current circuits of the motor armatures $A^1$ and $A^2$. Further, the break-points of the contactors F, $F^1$ and $F^9$ are connected in parallel with the exciting winding $h^1$ of another contactor H. The winding $h^1$ is in series with a resistance J and connected to the voltage of the source of current which feeds the plant. A short-circuited induction coil $h^2$ which is arranged adjacent to the contactor H, serves to retard the switching-in motion of the latter. The break of the contactor H which, in opposition to the action of a spring $h^3$, is held in open position by the exciting winding $h^1$, has parallel connection with the line G which includes the break adapted to be bridged by the push-button switch $g^1$.

The operation of the overload protective system according to Fig. 2 is as follows. If an overload is produced in one of the armature circuits, such as for example in the circuit of the armature A, the contactor $F^9$ will immediately close the corresponding break, thereby short-circuiting the exciting winding $h^1$ of the retarded contactor H. After the expiration of a certain retardation caused by the induction current produced in the induction coil $h^2$, the contactor H will close the corresponding break. When closing the contactor H, the largest part of the resistance E is short-circuited so that the holding coil $d^4$ will open the overload circuit-breaker D. If, however, the overload disappears again from the circuit of the armature A, before the retarded contactor H has reached the end of its closing motion, the contactor $F^9$ will return to its open position without the overload circuit-breaker D having interrupted the current. Only in case the overload continues for some time, the line B, conducting the whole current, will be broken by the overload circuit-breaker. The retarded contactor H will not prevent, however, an immediate interruption of the current circuits which in case of accident will have to be effected by transitorily closing the push-button switch $g^1$.

A rapid release of the overload circuit-breaker D will also take place when the strength of current in the line B, which conducts the whole current and in which the releasing coil $d^3$ is placed, rises beyond the admissible load.

Claims:

1. In an electric system, the combination with a plurality of motors connected in parallel, a main current circuit and motor armature branch circuits, of an overload circuit-breaker in the main current circuit comprising two magnet coils, and a series of contactors arranged for co-operation with the several motor branch circuits, each of the said contactors being adapted, when operated, to produce in one of the said magnet coils an exciting current of a strength such as to cause the overload circuit-breaker to move into open position, and other magnet coil being connected in series with at least one of said motor armature circuits.

2. In an electric system, the combination with a plurality of motors, a main current circuit and motor armature circuits, of an overload circuit-breaker placed in the main current circuit, said circuit-breaker comprising a main current releasing coil and a shunted holding coil, and a series of contactors, each having its magnet windings placed in the circuit of one motor and adapted, when operated, to cause the opening of the overload circuit-breaker.

3. In an electric system, the combination with a plurality of motors connected in parallel, a main current circuit and motor armature circuits, of an overload circuit-breaker comprising a releasing coil and a holding coil, the said releasing coil being placed in one of the motor armature circuits, the other motor armature circuits and the circuit conducting the whole current for all of the motors containing each the magnet winding of one of a series of contactors adapted each to control the release of the overload circuit-breaker.

4. In an electric system, the combination with a plurality of motors connected in parallel, a main current circuit and motor armature circuits, of an overload circuit-breaker comprising a contact, a releasing coil and a holding coil, the said holding coil being put in shunt to the contacts of the circuit-breaker and being connected in series with a resistance adapted to be wholly or partly short-circuited, by means of a conductor containing a push-button switch.

5. In an electric system, the combination with a plurality of motors connected in parallel, a main current circuit and motor armature circuits, of an overload circuit-breaker comprising a contact and a releasing coil placed in the main current circuit and a holding coil put in shunt to the said contact, the holding coil being connected in series with a resistance which has connection with a circuit containing a push-button switch, and a series of contactors for controlling the action of the said holding coil, the said contactors comprising contacts which are connected in parallel with the circuit containing the push-button switch.

6. In an electric system, the combination with a plurality of motors connected in parallel, a main current circuit and motor armature circuits, of an overload circuit-breaker comprising a contact and a releasing coil placed in the main current circuit and a holding coil put in shunt to the said contact, the holding coil being connected in series with a resistance which has connection with a circuit containing a push-button switch, and a series of contactors for controlling the action of the said holding coil, the said contactors comprising contacts which are connected in parallel with the circuit containing the push-button switch, and another contactor including a contact, a magnet core, an exciting winding and means for retarding the operation of its magnet core, the contact of the last-mentioned contactor being connected in parallel to the said push-button switch and its exciting winding being connected in parallel to the contacts of the first-mentioned series of contactors which are adapted to control the release of the overload circuit-breaker.

The foregoing specification signed at Essen, Germany, this 17th day of February, 1922.

JAKOB PFRETZSCHNER.